UNITED STATES PATENT OFFICE.

EDMUND F. UPTON AND MARTIN E. FISHER, OF MINERAL CITY, OHIO, ASSIGNORS OF ONE-FOURTH TO DANIEL O. VANKIRK AND ONE-FOURTH TO EBEN VANKIRK, OF MINERAL CITY, OHIO.

METHOD OF MAKING A SOLUTION FOR HARD-RUBBER COATING.

No. 853,429.     Specification of Letters Patent.     Patented May 14, 1907.

Application filed October 10, 1906. Serial No. 338,230.

*To all whom it may concern:*

Be it known that we, EDMUND F. UPTON and MARTIN E. FISHER, citizens of the United States, residing at Mineral City, in the county of Tuscarawas and State of Ohio, have invented a new and useful Method of Making a Solution for Hard-Rubber Coating, of which the following is a specification.

The invention relates to the method or process of making a solution for the coating of wood, iron or other articles with hard rubber; and the object is to compose the coating so that the finished article cannot be readily distinguished in appearance or utility from one made throughout of hard rubber, with the advantage that an article with a metal base is stronger than one of rubber.

The coating is preferably composed of—two parts caoutchouc or india-rubber, preferably para, one part sulfur flour, preferably golden, two parts cotton seed oil, with preferably one-third part raw linseed oil, and eight parts naphtha, or other light petroleum.

The caoutchouc, or india-rubber is first thoroughly masticated in the usual manner, as by passing it between serrated rolls, during which time it is subjected to a bath of steam or hot water for softening the rubber and removing impurities. The sulfur and vegetable oils are then thoroughly mixed with the masticated rubber, as by milling with hot rolls, during which milling the sulfur flour and the oils are gradually applied to and worked into the rubber, and the same may then be cut or ground into comparatively small pieces. The substance thus composed is then dissolved in the naphtha, and is ready for application.

The article to be coated, as for instance an iron buckle, hook or ring for a harness, or a tube or pipe for chemical apparatus, is first cleaned, and is then dipped into the solution and hung to dry, say for about an hour, which dipping and drying is repeated as often as is necessary for obtaining the desired thickness of the coating; and the coating is then vulcanized, preferably in a dry heat, such as that which is produced by gas, gasolene or a radiator. The finished article thus coated has every appearance and utility of one made throughout of hard-rubber, and when made with a base of iron or steel, is much stronger than a solid rubber piece, and at the same time is a great deal less expensive to produce.

It will be understood that the exact proportions stated for the several ingredients are not essential, although the same have been found to give good results; and also that a single vegetable oil can be used, as for instance two and one-third parts of cotton-seed oil without any raw linseed oil, but the use of the two kinds has been found to be desirable.

What I claim as my invention, and desire to secure by Letters Patent, is—

1. The process of making a solution for hard-rubber coating consisting in masticating two parts india rubber in a steam or hot-water bath, then hot-milling therewith one part sulfur flour, two parts cotton-seed oil and one-third part raw linseed oil and then dissolving this substance in eight parts naphtha.

2. The process of making a solution for hard-rubber coating consisting in masticating india-rubber and milling therewith sulfur flour and cotton-seed and raw linseed oils and then dissolving this substance in a light petroleum.

3. The process of making a solution for hard-rubber coating consisting in masticating india-rubber and milling therewith sulfur flour and a vegetable oil and then dissolving this substance in a light petroleum.

4. The process of making a solution for hard-rubber coating consisting in milling india-rubber with sulfur flour and cotton-seed and raw linseed oils and then dissolving this substance in light petroleum.

5. The process of making a solution for hard-rubber coating consisting in milling india-rubber with sulfur flour and vegetable oils and then dissolving this substance in light petroleum.

In testimony whereof we have signed our names to this specification in the presence of two subscribing witnesses.

EDMUND F. UPTON.
              MARTIN E. FISHER.

Witnesses:
  A. C. FOWLE,
  THOS. C. FERRELL.